United States Patent
Obana et al.

(10) Patent No.: US 12,313,151 B2
(45) Date of Patent: May 27, 2025

(54) DRIVE POWER TRANSMITTING MECHANISM

(71) Applicant: Sony Interactive Entertainment Inc., Tokyo (JP)

(72) Inventors: Koichi Obana, Tokyo (JP); Kazuya Kikuchi, Tokyo (JP); Hiroshi Osawa, Kanagawa (JP)

(73) Assignee: Sony Interactive Entertainment Inc., Tokyo (JP)

( * ) Notice: Subject to any disclaimer, the term of this patent is extended or adjusted under 35 U.S.C. 154(b) by 44 days.

(21) Appl. No.: 18/550,169

(22) PCT Filed: Mar. 17, 2022

(86) PCT No.: PCT/JP2022/012414
§ 371 (c)(1),
(2) Date: Sep. 12, 2023

(87) PCT Pub. No.: WO2022/209983
PCT Pub. Date: Oct. 6, 2022

(65) Prior Publication Data
US 2024/0151297 A1     May 9, 2024

(30) Foreign Application Priority Data
Mar. 30, 2021 (JP) ................. 2021-057987

(51) Int. Cl.
*F16H 37/04* (2006.01)
*F16H 1/06* (2006.01)
(Continued)

(52) U.S. Cl.
CPC ............... *F16H 37/04* (2013.01); *F16H 1/06* (2013.01); *F16H 55/18* (2013.01); *F16H 63/3013* (2013.01); *F16H 2035/005* (2013.01)

(58) Field of Classification Search
CPC . F16H 37/04; F16H 1/06; F16H 55/18; F16H 2055/185; F16H 1/2863; F16H 57/12; F16H 2057/121
See application file for complete search history.

(56) References Cited

U.S. PATENT DOCUMENTS

| 7,604,560 | B2 | 10/2009 | Isamu |
| 2006/0240937 | A1 | 10/2006 | Isamu |
| 2008/0128196 | A1* | 6/2008 | Kuroumaru ............. F16H 57/12 180/444 |

FOREIGN PATENT DOCUMENTS

| JP | 2002213566 A | 7/2002 |
| JP | 2003269579 A | 9/2003 |

(Continued)

OTHER PUBLICATIONS

International Search Report for corresponding PCT Application No. PCT/JP2022/012414, 4 pages, dated May 24, 2022.

*Primary Examiner* — Derek D Knight
(74) *Attorney, Agent, or Firm* — Kilpatrick Townsend & Stockton LLP

(57) ABSTRACT

There is provided a drive power transmitting mechanism that can transmit drive power losslessly and can be used in environments where silence is required. The drive power transmitting mechanism includes a rotor having a first outer circumferential surface and rotatable about a first rotational axis, a rotor having a second outer circumferential surface pressed against the first outer circumferential surface and rotatable about a second rotational axis due to a frictional force produced between the second outer circumferential surface and the first outer circumferential surface, a gear rotatable in unison with the rotor about the first rotational axis, and a gear rotatable in unison with the rotor about the second rotational axis, in which the gear and the gear are brought into mesh with each other when the second outer (Continued)

circumferential surface slips against the first outer circumferential surface.

7 Claims, 7 Drawing Sheets

(51) Int. Cl.
  *F16H 55/18*  (2006.01)
  *F16H 63/30*  (2006.01)
  F16H 35/00  (2006.01)

(56) References Cited

FOREIGN PATENT DOCUMENTS

| | | |
|---|---|---|
| JP | 200664170 A | 3/2006 |
| JP | 2006300221 A | 11/2006 |

* cited by examiner

DRIVE POWER TRANSMITTING MECHANISM

TECHNICAL FIELD

The present disclosure relates to a drive power transmitting mechanism.

BACKGROUND ART

For example, PTL 1 discloses a drive power transmitting mechanism including gears that rotate in mesh with each other.

CITATION LIST

Patent Literature

[PTL 1] JP 2003-269579A

SUMMARY

Technical Problems

If gaps (also referred to as "backlashes") between the gears that rotate in mesh with each other are large, then the gears are likely to cause noises and vibrations when they hit each other. Therefore, using the drive power transmitting mechanism in environments where silence is required is restrained. Furthermore, backlashes tend to lead to a loss of drive power to be transmitted. On the other hand, attempts to reduce the gaps between the gears demand dimensional accuracy of the gears. Further, one proposal may be to employ a structure that uses two rotors (also referred to as "friction wheels") having outer circumferential surfaces pressed against each other, rather than gears, for transmitting drive power. However, as the outer circumferential surfaces of the rotors are liable to slip against each other, the proposed structure may not be able to transmit drive power normally in some situations.

Solution to Problems

A drive power transmitting mechanism proposed in the present disclosure includes a first rotor having a first outer circumferential surface and rotatable about a first rotational axis, a second rotor having a second outer circumferential surface pressed against the first outer circumferential surface and rotatable about a second rotational axis due to a frictional force produced between the second outer circumferential surface and the first outer circumferential surface, a first gear rotatable in unison with the first rotor about the first rotational axis, and a second gear rotatable in unison with the second rotor about the second rotational axis, in which the first gear and the second gear are brought into mesh with each other when the second outer circumferential surface slips against the first outer circumferential surface. The drive power transmitting mechanism is able to transmit drive power in a lossless fashion and can be used in environments where silence is required.

DESCRIPTION OF EMBODIMENT

Figure 1:
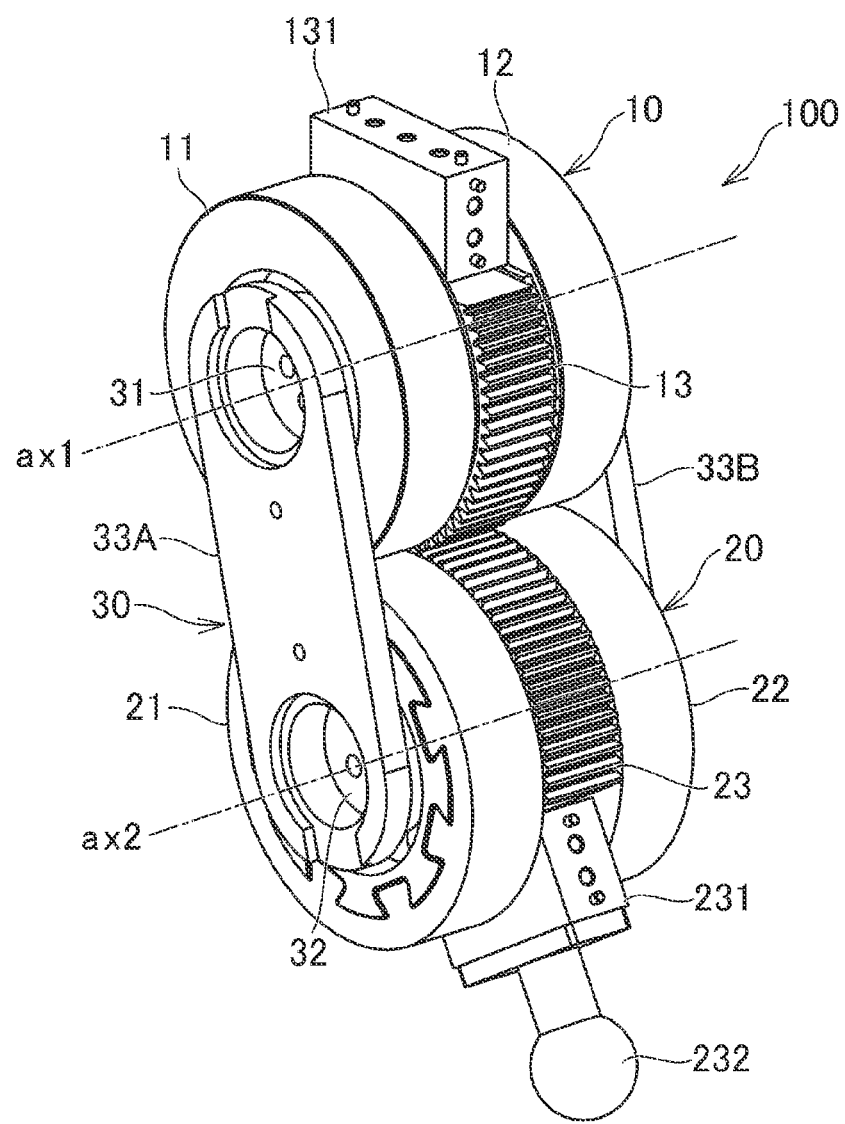
FIG. 1 is a perspective view illustrating an overall structure of a drive power transmitting mechanism according to a present embodiment.
Figure 2:
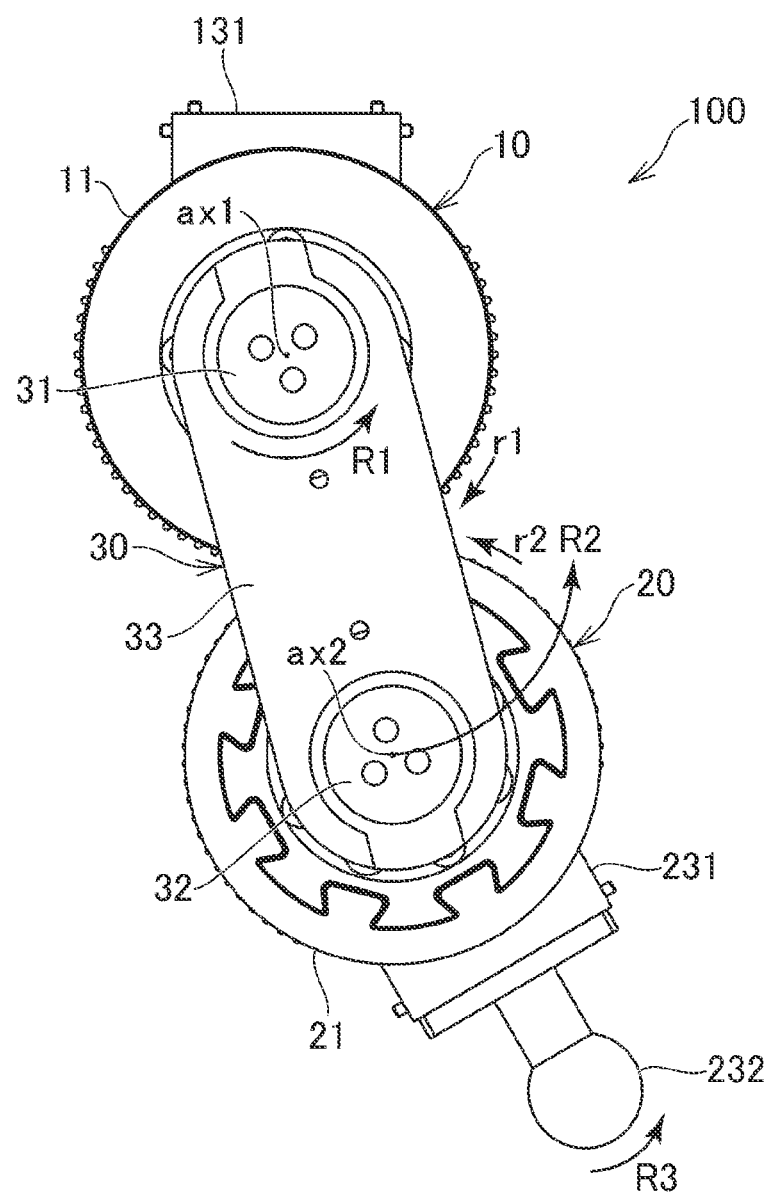
FIG. 2 is a plan view illustrating the overall structure of the drive power transmitting mechanism according to the present embodiment.
Figure 3:
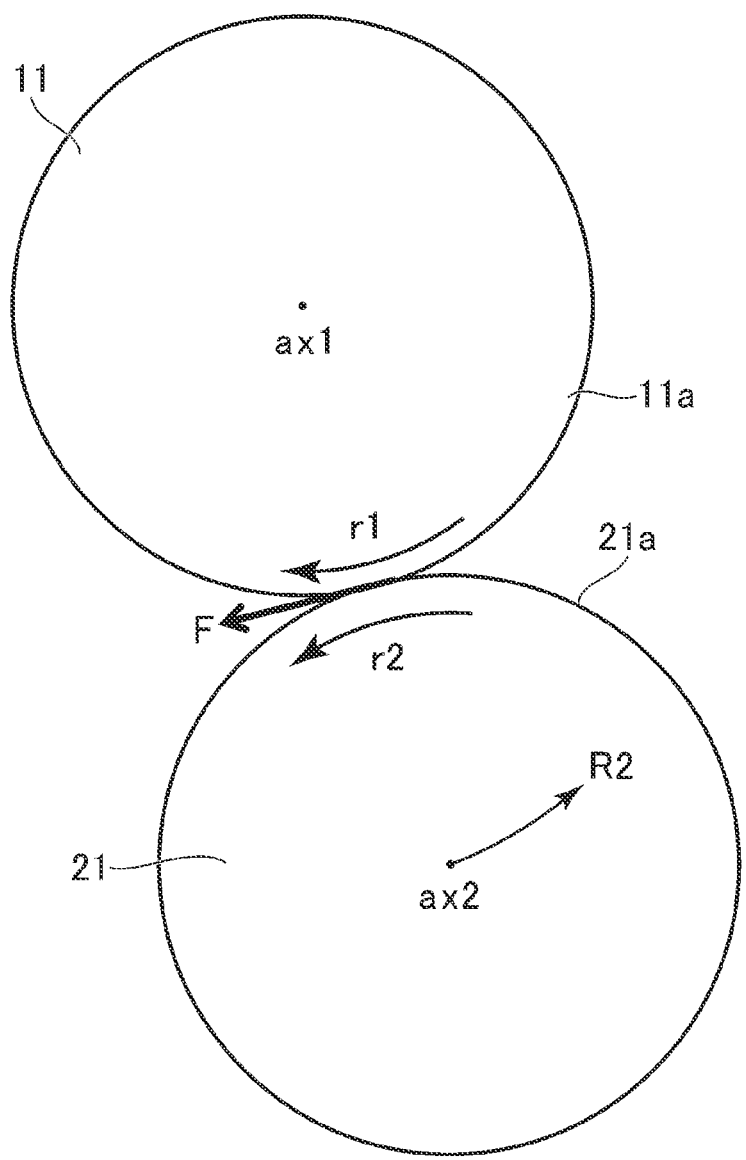
FIG. 3 is a plan view illustrating a rotor of a fixed unit and a rotor of a drive unit according to the present embodiment.
Figure 4:
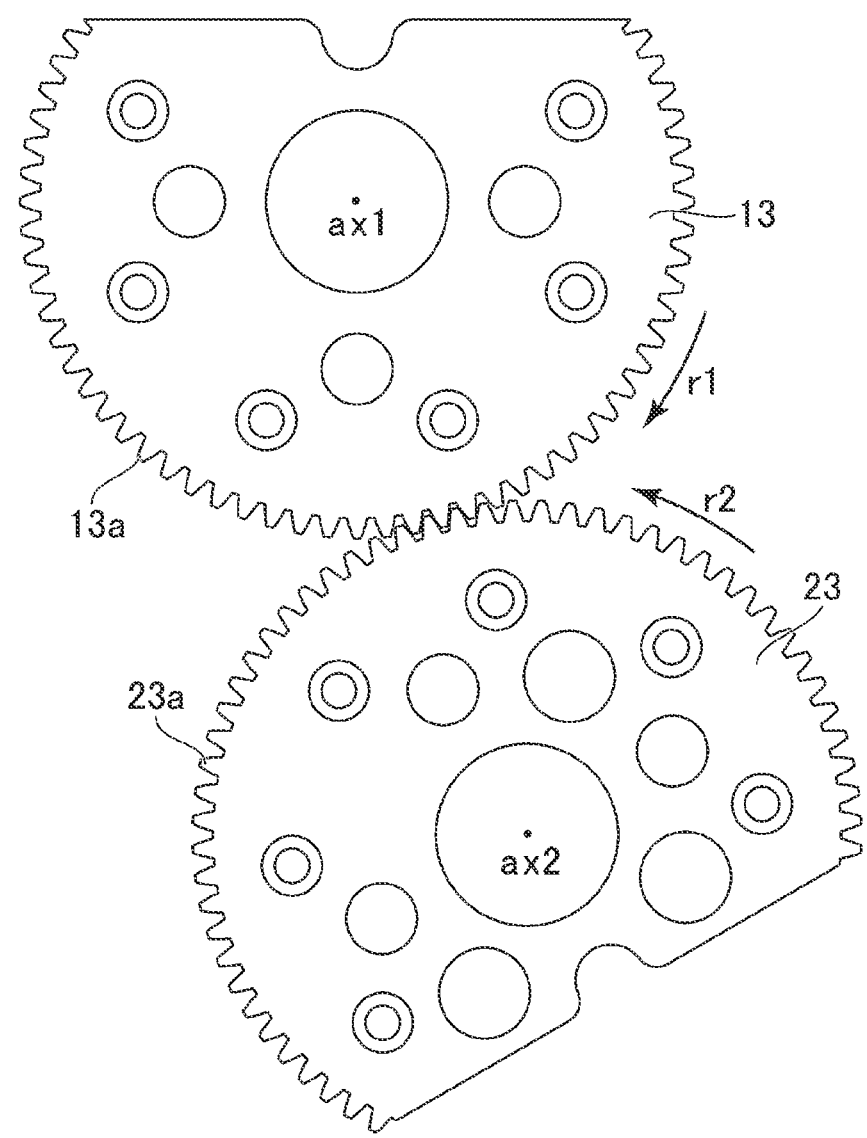
FIG. 4 is a plan view illustrating a first gear and a second gear according to the present embodiment.
Figure 5:
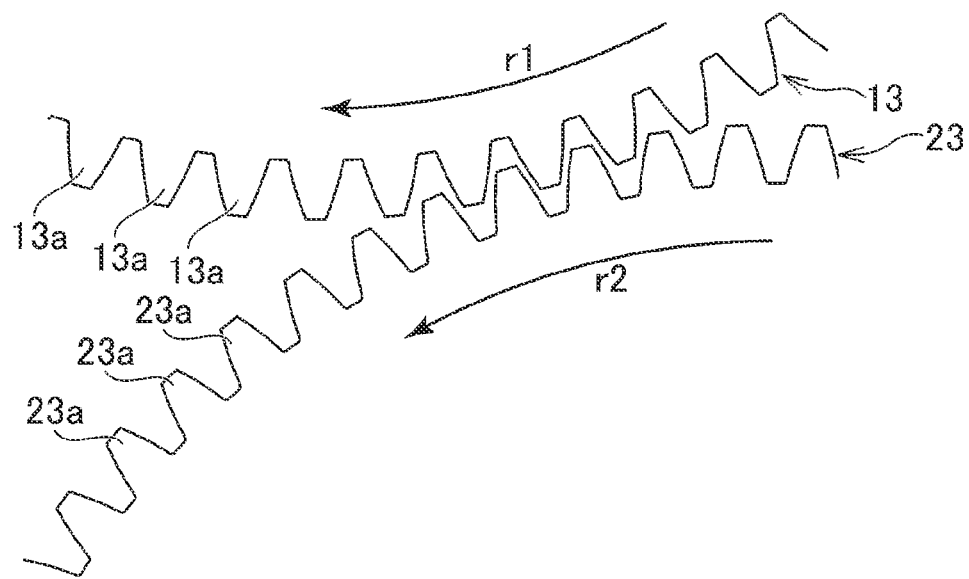
FIG. 5 is an enlarged plan view illustrating the first gear and the second gear that are rotating in response to rotation of the rotors.
Figure 5:
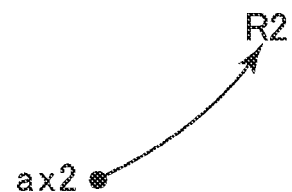
Figure 6:
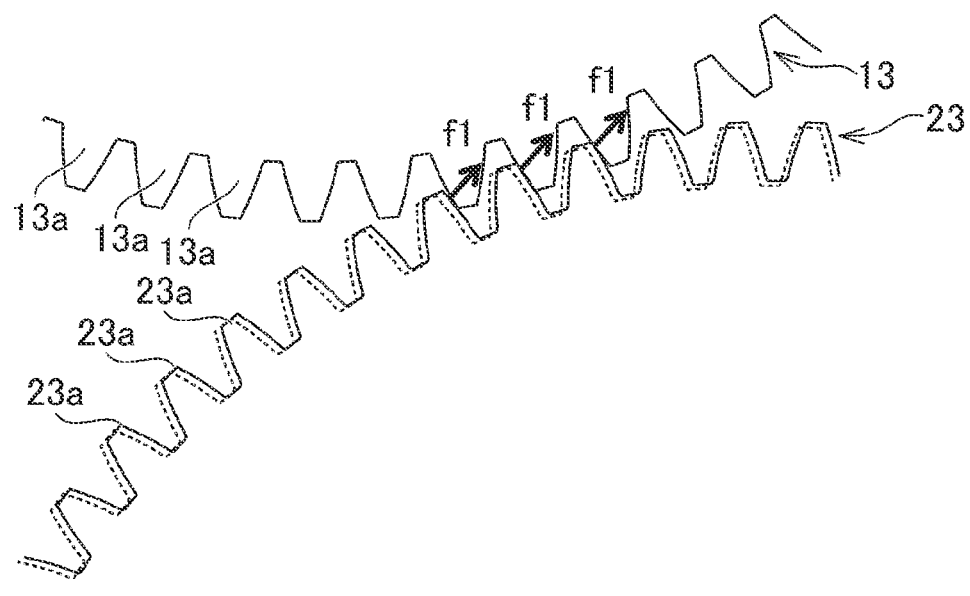
FIG. 6 is an enlarged plan view illustrating the manner in which the second gear hits the first gear when the rotors slip against each other.
Figure 6:
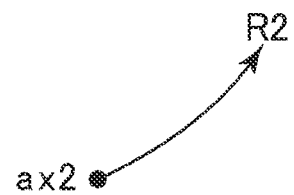
Figure 7:
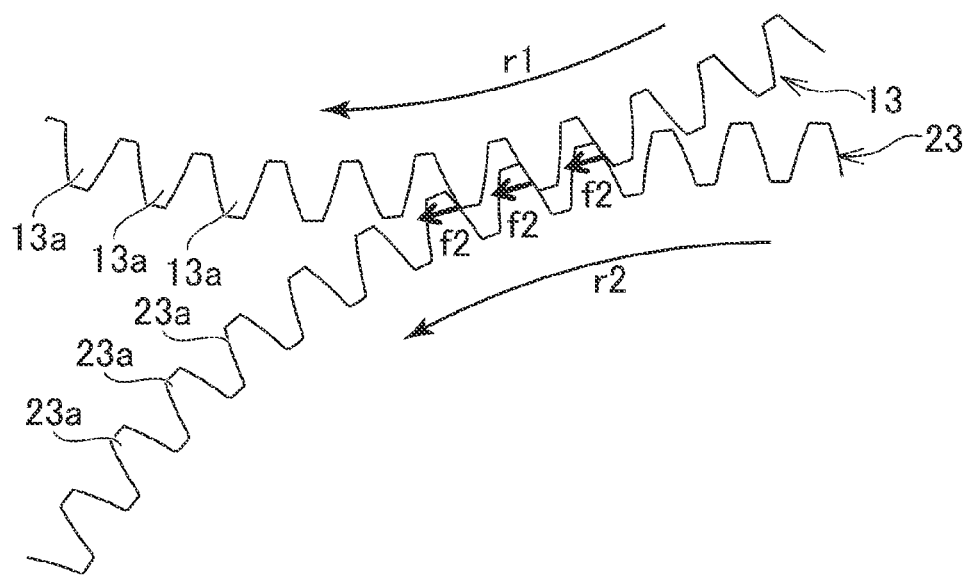
FIG. 7 is an enlarged plan view illustrating the manner in which the first gear and the second gear rotate in mesh with each other.
Figure 7:
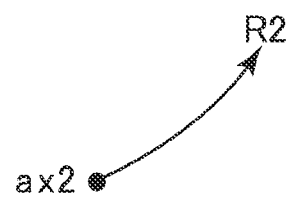

An embodiment of the present disclosure (hereinafter referred to as the "present embodiment") will be described hereinbelow with respect to the drawings. FIG. 1 is a perspective view illustrating an overall structure of a drive power transmitting mechanism according to the present embodiment. FIG. 2 is a plan view illustrating the overall structure of the drive power transmitting mechanism according to the present embodiment. FIG. 3 is a plan view illustrating a rotor of a fixed unit and a rotor of a drive unit according to the present embodiment. FIG. 4 is a plan view illustrating a first gear and a second gear according to the present embodiment. FIG. 5 is an enlarged plan view illustrating the first gear and the second gear that are rotating in response to rotation of the rotors. FIG. 6 is an enlarged plan view illustrating the manner in which the second gear hits the first gear when the rotors slip against each other. FIG. 7 is an enlarged plan view illustrating the manner in which the first gear and the second gear rotate in mesh with each other.

Incidentally, in FIGS. 5 to 7, gaps (also referred to as "backlashes") between teeth 13a of a first gear 13 and teeth 23a of a second gear 23 are illustrated as larger than the real gaps for illustrative purposes. However, the gaps between the teeth 13a of the first gear 13 and the teeth 23a of the second gear 23 may be of such a size as to allow the gears to rotate in mesh with each other.

[Outline of Drive Power Transmitting Mechanism 100]

A drive power transmitting mechanism 100 is a device for transmitting drive power applied from a power source such as an electric motor, not illustrated, to drive an end effector 232. The drive power transmitting mechanism 100 may be used in a joint of an arm or a leg of a humanoid or animaloid robot, for example. Moreover, the drive power transmitting mechanism 100 may be accommodated in a housing that makes up an outer shell of a humanoid or animaloid robot.

[Structure of Drive Power Transmitting Mechanism 100]

The structure of the drive power transmitting mechanism 100 will be described hereinbelow with reference to FIGS. 1 and 2. The drive power transmitting mechanism 100 has a fixed unit 10, a drive unit 20, and a link mechanism 30.

[Structure of drive Power Transmitting Mechanism 100: Fixed Unit 10]

The fixed unit 10 includes an adapter 131 to be fixedly connected to a member other than the drive power transmitting mechanism 100. For example, the adapter 131 may be connected to a torso of a humanoid or animaloid robot.

As illustrated in FIG. 1, the fixed unit 10 includes a rotor 11, a rotor 12, and a gear 13. The gear 13 is sandwiched between the rotor 11 and the rotor 12 along directions in which a rotational axis ax1 extends. The rotor 11, the rotor 12, and the gear 13 are fixed to each other such that they can rotate in unison about the rotational axis ax1.

The rotor 11 and the rotor 12 are each shaped as a disk and have diameters identical to each other. Further, at least an outer circumferential surface 11a of the rotor 11 is made of an elastic material. This also holds true for the rotor 12.

The fixed unit 10 has an axial hole defined centrally therein through which an input support member 31 of the link mechanism 30 is inserted. Specifically, the axial hole is defined centrally in the rotor 11, the rotor 12, and the gear 13 and extends along the directions in which the rotational axis ax1 extends.

Further, as illustrated in FIG. 4, the gear 13 has a plurality of teeth 13a formed partly thereon in a circumferential movable range where the gear 13 is movable about the rotational axis ax1. The gear 13 is free of teeth 13a in the other circumferential portion than the range. The adapter 131 is mounted on the other circumferential portion of the gear 13 that is free of the teeth 13a. In FIGS. 5 to 7, only some of the teeth of the gear 13 are denoted by 13a. Further, in FIG. 4, the adapter 131 is omitted from illustration.

[Details of Drive Power Transmitting Mechanism 100: Drive Unit 20]

As illustrated in FIG. 1, the drive unit 20 includes a rotor 21, a rotor 22, and a gear 23. The gear 23 is sandwiched between the rotor 21 and the rotor 22 along directions in which a rotational axis ax2 extends. The rotor 21, the rotor 22, and the gear 23 are fixed to each other such that they can rotate in unison about the rotational axis ax2.

The rotor 21 and the rotor 22 are shaped as a disk and have diameters identical to each other. At least an outer circumferential surface 21a of the rotor 21 is made of an elastic material. This also holds true for the rotor 22.

The rotor 21 is pressed against the rotor 11. Similarly, the rotor 12 is pressed against the rotor 22.

The drive unit 20 has an axial hole defined centrally therein through which an output support member 32 of the link mechanism 30 is inserted. Specifically, the axial hole is defined centrally in the rotor 21, the rotor 22, and the gear 23 and extends along the directions in which the rotational axis ax2 extends.

Further, the gear 23 has a plurality of teeth 23a formed partly thereon in a range where the gear 23 is movable in circumferentially about the rotational axis ax2. The gear 23 is free of teeth 23a in the other circumferential portion than the range. An adapter 231 described above is mounted on the other circumferential portion of the gear 23 that is free of the teeth 23a. The end effector 232 is mounted on the adapter 231. In FIGS. 1 and 2, the end effector 232 is illustrated as having such a shape that a spherical body is attached to a distal end of a rod, for example. However, the end effector 232 is not limited to the illustrated shape and may be shaped as a hand or a foot, for example. In FIGS. 5 to 7, only some of the teeth of the gear 23 are denoted by 23a. In FIG. 4, the adapter 231 is omitted from illustration.

[Details of Drive Power Transmitting Mechanism 100: Link Mechanism 30]

The link mechanism 30 includes the input support member (first support member) 31, the output support member (second support member) 32, and a connector 33 interconnecting the input support member 31 and the output support member 32.

Drive power applied from a drive source such as an electric motor, not illustrated, is applied to the input support member 31. The input support member 31 is inserted in the axial hole in the fixed unit 10 and supports the fixed unit 10.

The output support member 32 is inserted in the axial hole in the drive unit 20 and supports the drive unit 20.

In the link mechanism 30, the connector 33 includes a link 33A and a link 33B. The link 33A extends along a line joining the rotational axis ax1 and the rotational axis ax2 and interconnects an end of the input support member 31 along the directions in which the rotational axis ax1 extends and an end of the output support member 32 along the directions in which the rotational axis ax2 extends. The link 33B extends along a line joining the rotational axis ax1 and the rotational axis ax2 and interconnects the other end of the input support member 31 along the directions in which the rotational axis ax1 extends and the other end of the output support member 32 along the directions in which the rotational axis ax2 extends. In other words, the fixed unit 10 and the drive unit 20 are sandwiched between the link 33A and the link 33B along the directions in which the rotational axis ax1 (the rotational axis ax2) extends.

[Operation of Drive Power Transmitting Mechanism 100]

Next, operation of the drive power transmitting mechanism 100 will be described.

First, drive power (rotational power) from the power source such as an electric motor is applied to the input support member 31 of the link mechanism 30. The input support member 31 is thereby rotated about the rotational axis ax1 in a direction R1 illustrated in FIG. 2. When the input support member 31 is rotated, the output support member 32 integrally combined with the input support member 31 is rotated about the rotational axis ax1 in a direction R2 illustrated in FIG. 2.

When the output support member 32 is rotated about the rotational axis ax1 in the direction R2 illustrated in FIG. 2, the drive unit 20 is also rotated in the direction R2. In other words, the drive unit 20 is rotated about the rotational axis ax1 along an outer contour of the fixed unit 10. Stated otherwise, the drive unit 20 is moved relatively to the fixed unit 10 circumferentially about the rotational axis ax1 along the outer circumferential surfaces of the rotor 11 and the rotor 12.

At this time, as illustrated in FIG. 3, a frictional force (dynamic frictional force) F is produced between the rotor 11 and the rotor 21 that are pressed against each other. Likewise, a frictional force (dynamic frictional force) F is also produced between the rotor 12 and the rotor 22, though it is omitted from illustration.

A frictional force F causes the rotor 21 and the rotor 22 to rotate about the rotational axis ax2 in the direction r2 illustrated in FIGS. 2 and 3, and also causes the rotor 11 and the rotor 12 to rotate about the rotational axis ax1 in the direction r1 illustrated in FIGS. 2 and 3. For example, a magnitude of the frictional force F may have been adjusted by a surface roughness of the outer circumferential surfaces of the rotors.

At this time, the gear 13 integrally combined with the rotor 11 and the rotor 12 is also rotated about the rotational axis ax1 in the direction r1. Further, the gear 23 integrally combined with the rotor 21 and the rotor 22 is also rotated about the rotational axis ax2 in the direction r2. Thus, the fixed unit 10 is rotated in the direction r1 whereas the drive unit 20 is rotated in the direction r2.

According to the present embodiment, since the frictional force F is produced between the rotor 11 and the rotor 21 and between the rotor 12 and the rotor 22, when the fixed unit 10 is rotated in the direction r1 and the drive unit 20 is rotated in the direction r2, the gear 13 and the gear 23 are rotated while being kept out of contact with each other. FIG. 5 illustrates the manner in which the gear 13 is rotated in the direction r1 while being kept out of contact with the gear 23, and the gear 23 is rotated in the direction r2 while being kept out of contact with the gear 13.

Further, as the drive unit 20 is rotated about the rotational axis ax2 in the direction r2 in FIG. 2, the end effector 232 mounted on the adapter 231 on the gear 23 is rotated about the rotational axis ax2 in a direction R3 illustrated in FIG. 2.

As described above, the drive power transmitting mechanism 100 enables the drive unit 20 to move relatively to the fixed unit 10 in a circumferential direction about the rotational axis ax1 and also to rotate about the rotational axis ax2, thereby driving the end effector 232. Incidentally, although not described in detail, when the input support member 31 is rotated about the rotational axis ax1 in a direction opposite the direction R1 illustrated in FIG. 2, the drive power transmitting mechanism 100 reverses the movements described above. Specifically, the drive unit 20 is rotated about the rotational axis ax1 in a direction opposite the direction R2 illustrated in FIG. 2 along the outer contour of the fixed unit 10, and the end effector 232 is rotated about the rotational axis ax2 in a direction opposite the direction R3 illustrated in FIG. 2.

If an external force larger than the frictional force F produced between the rotor 11 and the rotor 21 and between the rotor 12 and the rotor 22 (hereinafter simply referred to as "between the rotors") acts between the rotors, the rotor 21 may slip against the rotor 11. The term "slip" used herein means that the outer circumferential surface 21a of the rotor 21 slides and shifts on the outer circumferential surface 11a of the rotor 11, changing a positional relation between the outer circumferential surface 11a of the rotor 11 and the outer circumferential surface 21a of the rotor 21 in the circumferential directions. Incidentally, when the rotor 21 slips against the rotor 11, the rotor 22 also similarly slips against the rotor 12.

If a slip occurs between the rotors, then when the drive unit 20 is rotated about the rotational axis ax1 along the contour of the fixed unit 10, the fixed unit 10 is not rotated about the rotational axis ax1, and the drive unit 20 is not rotated about the rotational axis ax2. Therefore, the end effector 232 is not rotated about the rotational axis ax2, failing to make a desired driving movement.

Then, according to the present embodiment, as described above, the fixed unit 10 includes the gear 13 in addition to the rotor 11 and the rotor 12, and the drive unit 20 includes the gear 23 in addition to the rotor 21 and the rotor 22.

FIG. 6 illustrates the gear 13 and the gear 23 at the time a slip occurs between the rotors. Incidentally, in FIG. 6, the broken line represents the gear 23 with respect to the gear 13 at the time no slip occurs between the rotors. In other words, the broken lines illustrated in FIG. 6 represent a positional relation between the gear 13 and the gear 23 at the time no slip occurs between the rotors.

When a slip occurs between the rotors, the gear 13 and the gear 23 change from the state in which they rotate while being kept out of contact with each other. As the positional relation between the gear 13 and the gear 23 changes, the gear 23 hits the gear 13. FIG. 6 illustrates the manner in which the drive unit 20 is rotated about the rotational axis ax1 in the direction R2 along the contour of the fixed unit 10, causing the gear 23 to hit the gear 13. When the gear 23 hits the gear 13, the gear 23 applies a pressing force f1 to the gear 13 in the direction indicated by the arrows in FIG. 6. More specifically, FIG. 6 illustrates the manner in which the side surfaces of the teeth 23a of the gear 23 that face upstream in the direction r2 hit the side surfaces of the teeth 13a of the gear 13 that face downstream in the direction r1 (see FIG. 6).

By hitting the gear 13, the gear 23 receives a reactive force f2 acting in the direction illustrated in FIG. 7 from the gear 13. FIG. 7 illustrates the manner in which the gear 23 is rotated about the rotational axis ax2 in the direction r2 under the reactive force f2 received from the gear 13. When the gear 23 is rotated in the direction r2, the gear 13 held in mesh with the gear 23 is rotated in the direction r1 illustrated in FIG. 7.

As a result, the fixed unit 10 is rotated about the rotational axis ax1 in the direction r1, whereas the drive unit 20 is rotated about the rotational axis ax2. After the rotors have slipped against each other, if the frictional force F acts again between the rotors, then the drive power is transmitted by the rotors as they are rotated again.

With the drive power transmitting mechanism 100 described above, while no external force is acting between the rotors, the drive power is transmitted by the rotors as they are rotated. When an external force acts between the rotors, causing a slip between the rotors, the gears are brought into mesh with each other to transmit driver power. Therefore, while no external force is acting between the rotors, the gears produce no hitting sounds and keep silent. Further, compared with a situation where the gears are rotated in mesh with each other, there is no loss of drive power to be transmitted due to backlashes, making it possible to drive the end effector 232 at desired timing. On the other hand, when an external force acts between the rotors, the gears are brought into mesh with each other to transmit drive power. As described above, the drive power transmitting mechanism 100 is able to transmit drive power losslessly and can be used in environments where silence is required.

According to the present embodiment, the diameter of the fixed unit 10 and the diameter of the drive unit 20 are the same as each other. However, these diameters may be different from each other. The different diameters make it possible to reduce or increase a speed of rotation of the drive unit 20 about the rotational axis ax2.

Further, according to the present embodiment, the outer circumferential surfaces of the rotor 11 and the rotor 21 are elastic and are elastically pressed against each other. However, the present invention is not limited to such details, and the rotor 11 and the rotor 21 may be arranged such that a frictional force may be produced at least between the rotor 11 and the rotor 21. For example, the outer circumferential surface of either one of the rotor 11 and the rotor 21 may be elastic, whereas the outer circumferential surface of the other may be rigid. This also holds true for the outer circumferential surfaces of the rotor 12 and the rotor 22 that are pressed against each other.

Further, according to the present embodiment, each of the rotors is shaped as a disk. However, the present invention is not limited to such details so long as the rotors have outer circumferential surfaces pressed against each other. For example, belts whose outer circumferential surfaces are pressed against each other may be used as the rotors.

Further, according to the present embodiment, the fixed unit 10 includes the two rotors sandwiching the gear 13, and the drive unit 20 includes the two rotors sandwiching the gear 23. Since the rotors of the fixed unit 10 and the rotors of the drive unit 20 are elastically pressed against each other, reactive forces are produced between the rotors. According to the present embodiment, inasmuch as the fixed unit 10 and the drive unit 20 are of a symmetrical structure along the directions in which the rotational axis ax1 (the rotational axis ax2) extends, a reactive force acting between the rotor 11 and the rotor 21 and a reactive force acting between the rotor 12 and the rotor 22 cancel each other, thereby stabilizing the postures of the fixed unit 10 and the drive unit 20. However, the fixed unit 10 may include only one rotor. Specifically, the fixed unit 10 may have the rotor 11 and the gear 13 and may be free of the rotor 12. In this case, the drive unit 20 may have the rotor 21 and the gear 23 and may be free of the rotor 22.

Further, a thickness of the gear 13 along the directions in which the rotational axis ax1 extends should be smaller than a thickness of the rotor 11 therealong. Similarly, a thickness of the gear 23 along the directions in which the rotational axis ax2 extends should be smaller than a thickness of the rotor 21 therealong. The smaller thickness of the gears 13 and 23 makes the thickness of the fixed unit 10 and the drive unit 20 smaller and maintains an area of contact between the outer circumferential surface 11a of the rotor 11 and the outer circumferential surface 21a of the rotor 21. As a result, the drive power transmitting mechanism 100 is reduced in size, and the frictional force F is easier to produce between the rotors. Incidentally, in this case, a thickness of the rotor 12 should be the same as the thickness of the rotor 11, and the thickness of the rotor 22 should be the same as the thickness of the rotor 21.

Further, according to the present embodiment, the drive power transmitting mechanism 100 has the link mechanism 30. However, the present invention is not limited to such details. For example, the drive power transmitting mechanism 100 may be of such a structure that it has a first support member inserted in the axial hole in the fixed unit 10 and having an end supported by a housing that accommodates the drive power transmitting mechanism therein and a second support member inserted in the axial hole in the drive unit 20, the first support member and the second support member being connected to each other.

Further, according to the present embodiment, when the link mechanism 30 is rotated about the rotational axis ax1, the drive unit 20 is rotated along the contour of the fixed unit 10. However, the present invention is not limited to such details. That is, the drive unit 20 may not be movable relatively to the fixed unit 10. According to such a modification, while the fixed unit 10 and the drive unit 20 are keeping their relative positions, the drive unit 20 is rotated about the rotational axis ax2 to drive the end effector 232.

The invention claimed is:

1. A drive power transmitting mechanism comprising:
   a first rotor having a first outer circumferential surface and rotatable about a first rotational axis;
   a second rotor having a second outer circumferential surface pressed against the first outer circumferential surface and rotatable about a second rotational axis due to a frictional force produced between the second outer circumferential surface and the first outer circumferential surface;
   a first gear rotatable in unison with the first rotor about the first rotational axis;
   a second gear rotatable in unison with the second rotor about the second rotational axis;
   a first support member by which the first rotor and the first gear are rotatably supported for rotation about the first rotational axis;
   a second support member by which the second rotor and the second gear are rotatably supported for rotation about the second rotation axis; and
   a link extending along a line joining the first rotational axis and the second rotational axis and interconnects the first support member and the second support member, wherein
   the first gear and the second gear are brought into mesh with each other when the second outer circumferential surface slips against the first outer circumferential surface.

2. The drive power transmitting mechanism according to claim 1, comprising:
   a third rotor having a third outer circumferential surface, the third rotor and the first rotor sandwiching the first gear therebetween along directions in which the first rotational axis extends, the third rotor being rotatable in unison with the first rotor and the first gear about the first rotational axis; and
   a fourth rotor having a fourth outer circumferential surface pressed against the third outer circumferential surface, the fourth rotor and the second rotor sandwiching the second gear therebetween along directions in which the second rotational axis extends, the fourth rotor being rotatable in unison with the second rotor and the second gear about the second rotational axis due to a frictional force produced between the fourth outer circumferential surface and the second outer circumferential surface.

3. The drive power transmitting member according to claim 1, wherein
   the first support member is rotatable about the first rotational axis by drive power from a power source, and
   the second support member rotates the second rotor about the first rotational axis along the first outer circumferential surface in response to rotation of the first support member about the first rotational axis.

4. The drive power transmitting mechanism according to claim 1, wherein the first gear and the second gears are rotatable out of contact with each other when the first rotor is rotated about the first rotational axis and the second rotor is rotated about the second rotational axis.

5. The drive power transmitting mechanism according to claim 1, wherein a thickness of the first gear along the directions in which the first rotational axis extends is smaller than a thickness of the first rotor therealong.

6. The drive power transmitting mechanism according to claim 1, wherein at least one of the first outer circumferential surface and the second outer circumferential surface is elastic and is elastically pressed against the other thereof.

7. The drive power transmitting mechanism according to claim 1, wherein the first gear has teeth formed partly thereon in a circumferential movable range where the first gear is movable about the first rotational axis.

* * * * *